April 25, 1967

T. H. DEXTER ETAL     3,316,060

RECOVERY OF ANHYDROUS HYDROGEN FLUORIDE FROM GASEOUS MIXTURES

Filed May 27, 1964     2 Sheets-Sheet 1

United States Patent Office 3,316,060
Patented Apr. 25, 1967

3,316,060
RECOVERY OF ANHYDROUS HYDROGEN FLUORIDE FROM GASEOUS MIXTURES
Theodore Henry Dexter, Lewiston, and John A. Peterson, Niagara Falls, N.Y., assignors to Hooker Chemical Corporation, Niagara Falls, N.Y., a corporation of New York
Filed May 27, 1964, Ser. No. 370,414
4 Claims. (Cl. 23—153)

This invention relates to the recovery of hydrogen fluoride from a mixture of gases and its isolation as pure anhydrous hydrogen fluoride. More particularly, this invention relates to absorbing hydrogen fluoride from dilute gaseous mixtures, converting it to an ammonium fluoride salt, and recovering anhydrous hydrogen fluoride from the gaseous decomposition products of the ammonium fluoride salt.

Fluoride compounds from industrial processes may be found in minor amounts in waste gases. Due to their extremely corrosive nature, toxicity and harmful effects, it is desirable to remove the fluorides from such exhaust gases prior to releasing them to the atmosphere. Various methods have been devised to accomplish this. One well known method was to scrub the waste gases with an aqueous solution. The minor percentages of fluoride values would be absorbed in the water. Once absorbed in the water, various methods have been devised for precipitating and separating the fluoride values from other soluble gases and solids also absorbed by the aqueous solution. Ammoniation of the aqueous scrubber solution purifies the fluoride values by precipitating dissolved silicas and phosphates and forming soluble ammonium fluoride. The ammonium fluoride solution would subsequently be recovered as an ammonium fluoride salt by one of a number of processes involving dehydrating at elevated temperatures.

Several methods have also been proposed for recovering hydrogen fluoride from the ammonium fluoride salt, preferably ammonium bifluoride. It is known that bifluoride salts decompose on heating at elevated temperatures to yield hydrogen fluoride gas and a fluoride salt. However, since heated ammonium bifluoride yields two gases, ammonia and hydrogen fluoride, which are difficultly separable the volatilization and/or decomposition will not result in a ready separation of hydrogen fluoride from the ammonia. Therefore, previous suggestions were to form the alkali metal fluoride salt from ammonium fluoride and to pyrolyze it, forming a solid salt and a gas. This route is not completely satisfactory since it involves several additional processing steps in converting to another salt and subsequently pyrolyzing the formed salt to isolate the hydrogen fluoride.

It is an object of this invention to provide a method of directly recovering anhydrous hydrogen fluoride from ammonium fluoride salts. Another object of this invention is to provide a practical and economical method of recovering anhydrous hydrogen fluoride from ammonium bifluoride. A further object of this invention is to provide a method of recovering anhydrous ammonium fluoride from dilute gaseous mixtures of fluoride compounds. Yet another object is to provide a means of separating hydrogen fluoride from gaseous ammonia and recovering both anhydrous hydrogen fluoride and ammonia as isolated products.

The objects of this invention are accomplished by the process which comprises heating and decomposing ammonium fluoride salts to obtain a gas containing ammonia and hydrogen fluoride, decomposing the ammonia component to hydrogen and nitrogen and subsequently recovering hydrogen fluoride from the gaseous mixture of hydrogen, nitrogen and hydrogen fluoride.

This invention provides a more direct route for recovering hydrogen fluoride from ammonium fluoride salts. The process permits the elimination of several steps which were previously required to effect such a separation, in addition to eliminating the requirement of additional reactants. This process is particularly economically attractive when the nitrogen and hydrogen decomposition products are reconverted to ammonia.

The ammonium fluoride salt used in the present process is any ammonium fluoride salt, especially ammonium fluoride, ammonium bifluoride and ammonium polyacid fluorides. Since the salt most frequently used with this invention is ammonium bifluoride, the disclosure herein will be directed primarily to ammonium bifluoride. It is, however, intended that other ammonium fluoride salts be included as a part of this invention and applicable therein.

Ammonium bifluoride from which hydrogen fluoride is recovered by the present process may be derived from any available source. In most instances, the ammonium bifluoride used is that formed by the thermal conversion of ammonium fluoride in aqueous solution to ammonium bifluoride during evaporation of water at temperatures exceeding 100 degrees centigrade according to the reaction

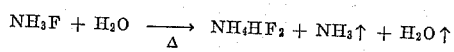

$$NH_3F + H_2O \xrightarrow{\Delta} NH_4HF_2 + NH_3\uparrow + H_2O\uparrow$$

Ammonium fluoride solutions are normally obtained by scrubbing waste exhaust gases from industrial processes yielding fluoride values. The source of these exhaust gases may be acidulation of phosphate rock, fluorspar or fluoroapatite, produced in the refining of aluminum by electrolysis of cryolite, fluellite, topaz or some other process. The gas stream may contain large percentages of fluoride values, up to about 70 percent by volume, or the fluoride values may be present in relatively minor percentages, e.g. 1 to 2 percent by volume. Industrial gas streams, such as those noted, generally contain impurities other than fluoride-containing compounds. The impurities may be separated from the fluoride values by selective precipitation, filtration and the like.

Various methods are employed to preferentially absorb fluoride containing values from gaseous mixtures such as the waste gases described. If the exhaust gases contain solids such as silicon dioxide, a filter or electrostatic precipitator may be used prior to scrubbing with an aqueous solution. An acidic pH is normally maintained in the scrubbing liquor to promote the absorption of fluoride values and to minimize the absorption of sulfur dioxide and other undesired gases. Subsequent ammoniation of the scrubbing liquor precipitates the undesired products absorbed. Thus relatively pure ammonium fluoride solutions are obtained.

Ammonium fluoride solutions are thermally converted to ammonium bifluoride by evaporating the water at a temperature above 100 degrees centigrade. More particularly, the temperature range for such conversion is 125 degrees centigrade to 180 degrees centigrade. Any volatile gases which were absorbed in the scrubbing operation are removed during the heat conversion to ammonium bifluoride as is any excess ammonia added during the ammoniation step.

The process of this invention does not require anhydrous ammonium bifluoride and therefore ammonium bifluoride containing up to about 5-6 percent water is useful. This is particularly beneficial to a continuous process in that the loss of fluorides during dehydration and conversion to the bifluoride is minimized.

Several methods are available for recovering anhydrous hydrogen fluoride from a nitrogen hydrogen and hydrogen fluoride gas mixture. The choice of the method used will depend on whether there is a significant amount of water to be removed from the starting ammonium bifluoride compound to produce anhydrous hydrogen fluoride.

After forming ammonium bifluoride, heating is continued to vaporize it. Ammonium bifluoride begins to decompose to ammonia and hydrogen fluoride between its melting point of approximately 126 degrees centigrade and 250 degrees centigrate, at which it is substantially volatilized. The thermal conversion and dehydration is effected at atmospheric or reduced pressures as low as about 30 millimeters of mercury. The gaseous products are then further heated to effect the thermal decomposition of the ammonia to nitrogen and hydrogen. Ammonia pyrolyzes at temperatures of about 1000 degrees centigrade but the pyrolysis may be accomplished at lower temperatures by using a suitable catalyst.

By use of a catalyst, temperatures in the range of 230 degrees centigrade to 1000 degrees centigrade are sufficient to effect decomposition of ammonia. Therefore, because of the lower temperature requirement, it is preferred to use a catalyst in the pyrolysis step.

The preferred catalysts are the Group VIII, IB, IIB and VIB metals as described in Lange's Handbook of Chemistry 8th Edition, pages 56–57, especially the metals iron, nickel, copper, zinc, cadmium, cobalt, chromium, their oxides, e.g., iron oxide, nickel oxide and so forth, their fluorides, e.g., ferric fluoride, nickel fluoride, chromium fluoride and so forth and mixtures thereof. Other metal catalysts may also be used but the catalytic activity should not be destroyed by the presence or action of hydrogen fluoride and any metal fluorides formed should not be significantly volatile at the temperature used.

The presence of a high proportion of hydrogen fluoride in the gas stream employed leads to conversion of metal oxide catalysts to fluorides, at least to a measurable extent. For instance, nickel and copper metal catalysts quickly become covered with a film of the corresponding metal fluoride. If the starting ammonium fluoride salt, and hence the gas, is essentially anhydrous, fluoride formation predominates. If the starting ammonium fluoride salt contains a small percentage of water, it is believed that the water vapor in turn reacts with the metal fluorides present forming oxides and hydrogen fluoride gas. Thus, where pyrohydrolysis reactions take place, the metal oxide tends to form, the end result being a mixture of metal, metal oxide and/or metal fluoride. The exact composition may vary but does not appear to have much effect on catalytic activity once equilibrium is reached.

The potential conversion to fluorides and oxides thus limits the number of metals and compounds which can be employed as catalyst for the decomposition of ammonia in a hydrogen fluoride gas stream. The above named metals are preferred.

Since nitrogen and hydrogen are relatively insoluble in aqueous solutions, in addition to being relatively non-condensable at the condensing temperature of hydrogen fluoride, several methods of recovering hydrogen fluoride from mixture with nitrogen and hydrogen are available. One method is compression and/or cooling, e.g., cooling to a temperature of 19 degrees centigrade or lower at atmospheric pressure to condense the hydrogen fluoride. This method may be used when the starting ammonium bifluoride is essentially anhydrous. Separation of water is therefore not necessary. On compression or cooling, liquid hydrogen fluoride is removed and the non-compressible and insoluble hydrogen and nitrogen gases are separated from liquid HF. Cooling temperatures in the range of 20 degrees centigrade to −30 degrees centigrade and pressures ranging from atmospheric to 15 to 20 atmospheres are sufficient to liquefy the hydrogen fluoride and thus separate it.

The hydrogen and nitrogen gases are preferably reconverted to ammonia by any suitable process, such as the Haber process.

These processes involve compression of the gases in a ratio of one mole nitrogen to three moles hydrogen at 300 to 1000 atmospheres, heating to 400 degrees centigrade to 600 degrees centigrade and passing the compressed and heated gases through a catalyst bed. Finely divided iron with potassium aluminate is a preferred catalyst. The gases coming off of the catalyst bed are cooled to about −7 degrees centigrade to −40 degrees centigrade. Liquid ammonia is removed and the unreacted hydrogen and nitrogen are recycled through the compressor.

Another means of separating the hydrogen fluoride from the gaseous nitrogen and hydrogen is to employ an aqueous scrubber. This method is particularly useful for obtaining anhydrous HF when the starting ammonium bifluoride contains water. When the gases coming off the catalyst bed contain water the following separation is preferably used. The gases are scrubbed with an aqueous scrubber liquid. Hydrogen fluoride is absorbed in the aqueous solution while nitrogen and hydrogen continue through the scrubber or series of scrubbers as gases. The nitrogen and hydrogen gases may then be converted back to the ammonia by known processes. The aqueous hydrogen fluoride-containing liquor from the scrubber is routed to a boiler and condenser system where the liquor is heated to its azeotropic boiling point. The vapors are condensed in a condenser maintained at a temperature of about 10 degrees centigrade to 45 degrees centigrade. This condenser temperature permits anhydrous hydrogen fluoride in excess of the azeotropic mixture to pass through the condenser while retaining the aqueous azeotrope. Hydrogen fluoride removed in this manner has a water content of less than 1 percent by weight. At the lower condenser temperatures, that is less than about 30 degrees centigrade, the hydrogen fluoride contains less than 0.5 percent water by weight. The condensed and cooled aqueous azeotrope solution is re-routed to the scrubber to absorb more hydrogen fluoride.

It will be readily recognized by those skilled in the art that various other methods of recovering hydrogen fluoride from a gas stream of hydrogen, nitrogen and hydrogen fluoride are readily adapted to the process of this invention. Therefore, this invention is not intended to be limited to the recovery processes described but to include other known processes that are equally applicable.

The invention is described more fully with reference to the accompanying flow sheets, in which:

FIGURE 1 is a flow sheet of the process of this invention using substantially anhydrous ammonium bifluoride as the starting ammonium fluoride salt. Solid or liquid ammonium bifluoride is heated at 126 degrees centigrade to 250 degrees centigrade to volatilize it in pre-heater 11.

Figure 1:
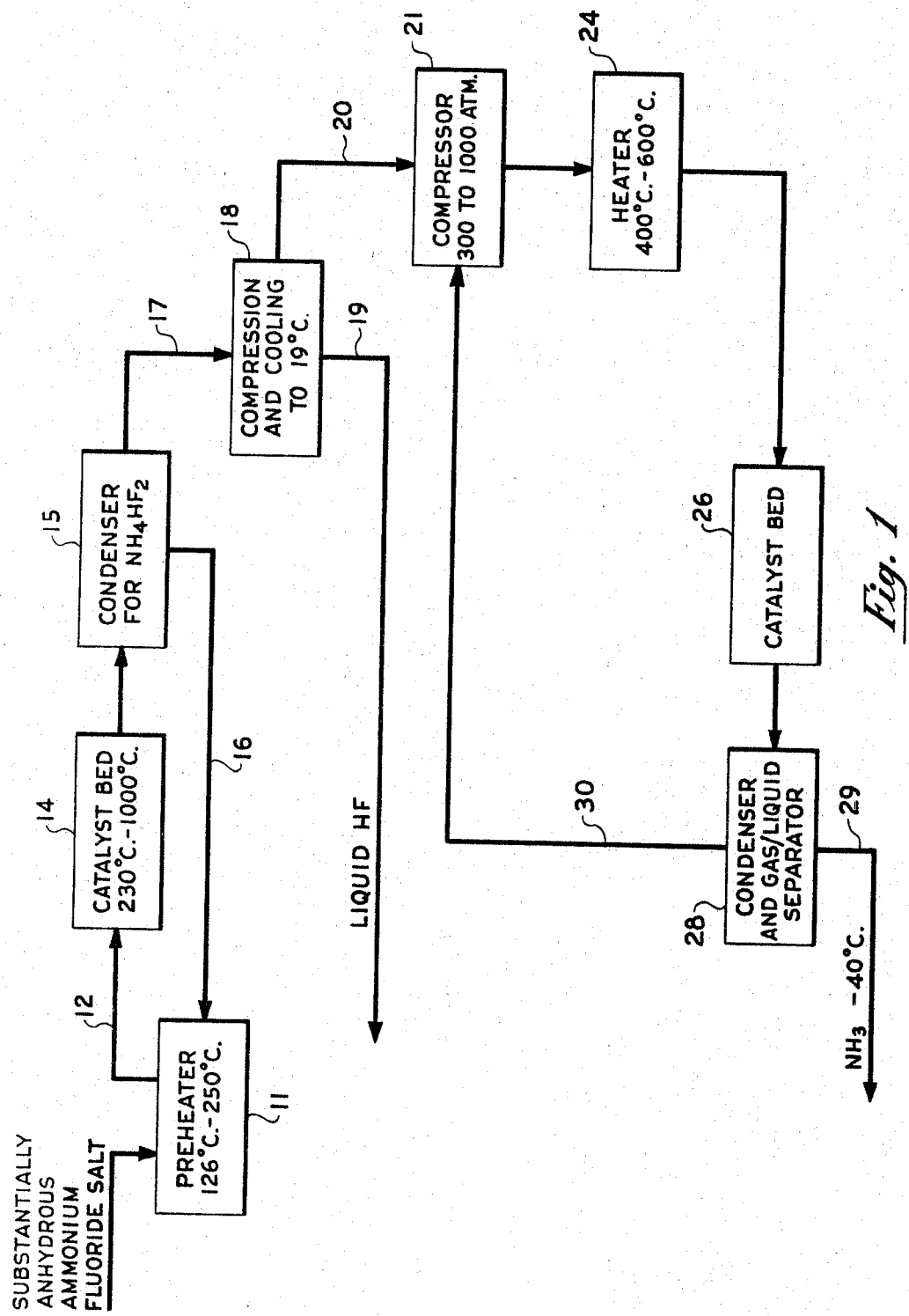
FIGURE 1 is a flow sheet illustrating one embodiment.

Vaporization of the hydrogen fluoride and ammonia components of ammonium bifluoride begins at about 100 degrees centigrade, with vapor pressure over molten ammonium bifluoride becoming equal to atmospheric pressure at about 230 degrees centigrade. It is preferred to use temperatures in the range of 200 degrees centigrade to 250 degrees centigrade in thhe pre-heater 11 stage so as to expedite the volatilization. The ammonium bifluoride gases are routed by conduit 12 to the catalyst bed 14 which is maintained at a temperature of 230 degrees centigrade to 1000 degrees centigrade. The catalyst bed 14 is of sufficient capacity so as to result in essentially complete pyrolysis of the ammonia. Nearly complete conversion is accomplished by forcing all of the gases into intimate contact with the catalyst material. Best results are obtained by using the catalyst in a finely divided or porous condition so as to obtain a large surface area. Alternatively fine wire gauze or mesh is used when the nature of the catalyst permits.

The gases coming off catalyst bed 14 are passed through condenser 15 maintained at a temperature of 126 degrees centigrade to 140 degrees centigrade. Condenser 15 removes, as ammonium bifluoride, ammonia not decomposed in passing through catalyst bed 14. The condensed ammonia bifluoride is returned to pre-heater 11 via conduit 16 for recycle.

The gases passing through the condenser 15 are routed through conduit 17 to compressor and cooler 18. Liquid anhydrous hydrogen fluoride is condensed and separated from the other gases at a temperature of 19 degrees centigrade or less and is removed via conduit 19.

Since nitrogen and hydrogen gas are relatively non-compressible and relatively insoluble in hydrogen fluoride under the conditions noted, they pass through compressor and cooler 18 via conduit 20 to another compressor 21.

Compressor 21 compresses the hydrogen and nitrogen to 300 to 1000 atmospheres prior to heating in heater 24 to a temperature of 400 degrees centigrade to 600 degrees centigrade. Since the gases are in the proper molar ratio of three hydrogen to one nitrogen, ammonia is formed on passing the heated and compressed gases through catalyst bed 26. Gases from catalyst bed 26 enter condenser 28 for separation and condensation of liquid ammonia. The ammonia condensed is removed via conduit 29 at about −40 degrees centigrade. Unreacted hydrogen and nitrogen are recycled via conduit 30 to compressor 21 for a subsequent pass over catalyst bed 26.

Figure 2:
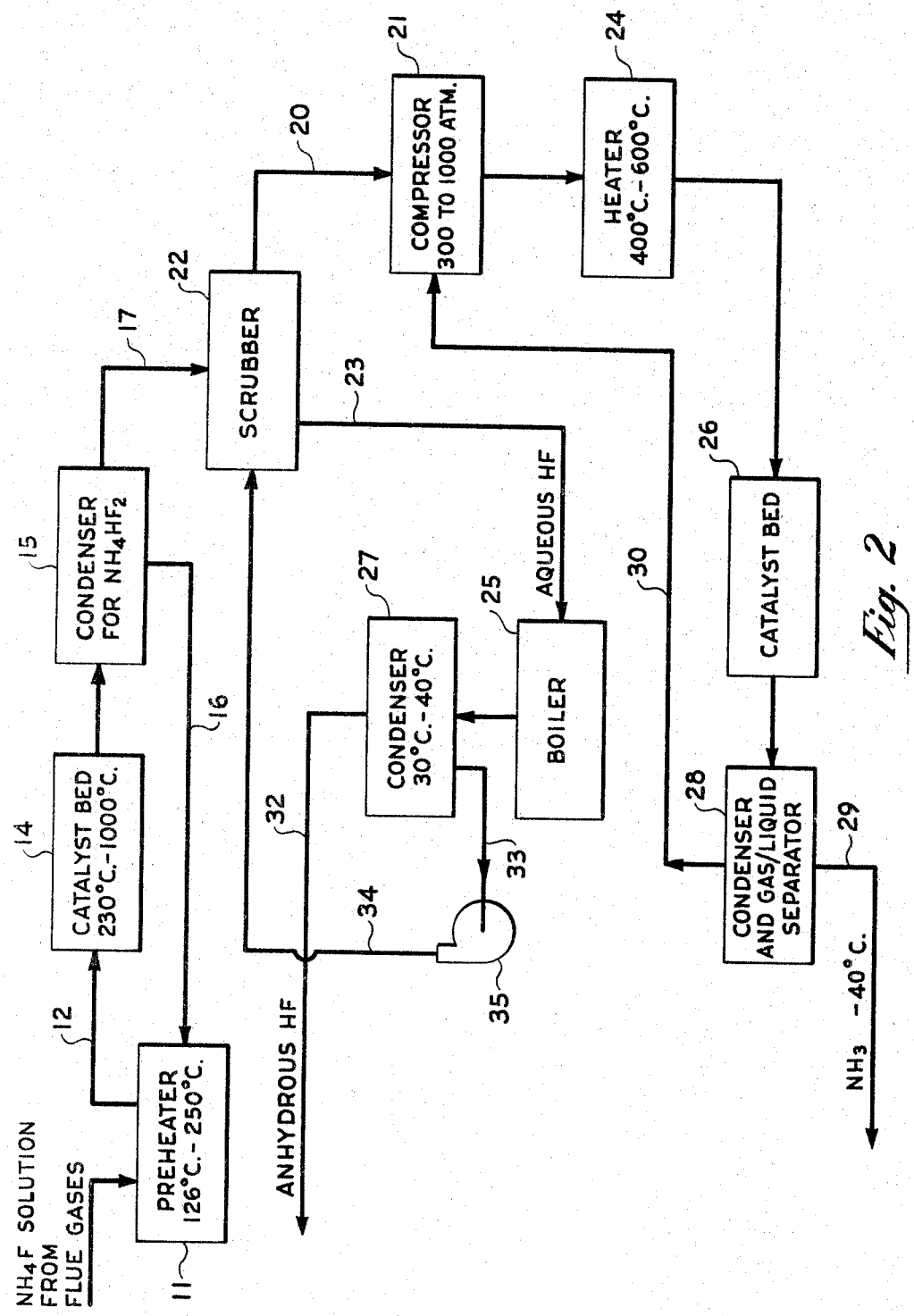
FIGURE 2 is a flow sheet illustrating another embodiment of the present invention.

The process illustrated in FIGURE 2 is particularly applicable to the recovery of anhydrous hydrogen fluoride when the starting ammonium fluoride salt is not anhydrous such as the solutions obtained in scrubbing flue gases. Allowing for this difference, the process is the same as illustrated in FIGURE 1 except for the novel separation of hydrogen fluoride from the ammonia pyrolysis products and water vapor.

Aqueous ammonium fluoride salt solution of 5 percent to about 90 percent by weight concentration is fed into pre-heater 11 and dehydrated to a water content of about 5 percent or less at a temperature of 100 degrees centigrade to about 150 degrees centigrade. Commencing at about 126 degrees centigrade up to about 250 degrees centigrade, the ammonia and hydrogen fluoride vapors formed are conducted via conduit 12 to the catalyst bed 14 constructed and maintained under the conditions previously described. The gases leaving catalyst bed 14 pass through condenser 15 maintained at a temperature of 126 degrees centigrade to 140 degrees centigrade. This condenser removes, as ammonium bifluoride, ammonia not decomposed in passing through catalyst bed 14 and recycle the fluoride salt via conduit 16 to pre-heater 11. The uncondensed gases, comprising primarily hydrogen, nitrogen, hydrogen fluoride, and water vapor, pass to scrubber 22 via conduit 17.

Scrubber 22 removes the hydrogen fluoride and water from the gas stream using an aqueous scrubbing liquor comprising water and hydrogen fluoride. The hydrogen and nitrogen gases pass through scrubber 22 via conduit 20. Because of the high solubility of hydrogen fluoride in water, the scrubbing operation effectively removes all of the hydrogen fluoride. More than one scrubber can be used to ensure complete removal of hydrogen fluoride.

The aqueous hydrogen fluoride liquor, after absorbing additional hydrogen fluoride, is routed from scrubber 22 via conduit 23 to boiler 25. There the scrubber liquor is heated to its boiling point so as to vaporize it. Hydrogen fluoride in excess of the azeotropic boiling mixture, e.g., about 38 percent hydrogen fluoride and 62 percent water, is removed as a gas. The separation is effected using a condensation tower 27 for condensing the azeotrope while permitting the hydrogen fluoride content above the azeotropic mixture e.g. 38 percent hydrogen fluoride, to pass off via conduit 32.

It has been found that by regulating the condensation tower 27 temperature, the amount of water in the hydrogen fluoride removed from tower 27 may be controlled. Thus, by maintaining a condenser temperature of less than about 45 degrees centigrade, hydrogen fluoride removed will be substantially anhydrous, containing less than 1 percent water by weight. At lower condenser temperatures, even lower amounts of water are retained in the hydrogen fluoride gas. At a condenser temperature of 30 degrees centigrade, less than 0.5 percent water is retained in the hydrogen fluoride. It is therefore preferred to maintain a condenser temperature of less than about 30 degrees centigrade so as to obtain a more anhydrous product.

The condensed azeotropic mixture is removed from the condenser tower 27 and recycled as scrubbing liquor via conduits 33 and 34. A pump 35 maintains pressure for the aqueous liquor to pass through scrubber 22. Since the operation utilizes the high solubility of hydrogen fluoride in cool aqueous solutions, and its limited solubility in boiling solutions, the aqueous liquor may be further cooled to a lower temperature, e.g., 0 degrees centigrade to 30 degrees centigrade, prior to passing through scrubber 22. In this manner a greater amount of hydrogen fluoride is absorbed in a given amount of scrubber liquor.

The nitrogen and hydrogen removed from scrubber 22 via conduit 20 are re-converted to ammonia by known procedures. The method illustrated in FIGURE 2 is to compress the gases to 300 to 1000 atmospheres in compresser 21, heat the compressed gases to 400 degrees centigrade to 600 degrees centigrade in the heater 24 and subsequently pass the gases through catalyst bed 26. The ammonia formed is separated from unreacted hydrogen and nitrogen by condenser 28 from which liquid ammonia is removed via conduit 29. Unreacted hydrogen and nitrogen are recycled to compresser 21 via conduit 30 for a subsequent pass over catalyst bed 26.

The invention will be readily understood with reference to the following examples which are illustrations of certain preferred embodiments thereof. Unless otherwise indicated all temperatures are in degrees centigrade and all parts and percentages used herein are by weight.

*Example 1*

Hydrogen fluoride was recovered from ammonium bifluoride by votalizing ammonium bifluoride at 250 degrees centigrade and passing the gases through a nickel oxide catalyst bed. The catalyst bed was maintained at a temperature of 700 degrees centigrade to 800 degrees centigrade. The apparatus was constructed of nickel. Unreacted ammonium bifluoride was condensed at the exit of the cataylst bed and recycled. Analysis of the gases from the catalyst bed revealed a ratio of gases according to the equation: $2NH_4TH_2 \rightarrow 4HF + N_2 + 3H_2$. The hydrogen fluoride was recovered by absorbing it in water.

*Example 2*

Hydrogen fluoride was again recovered directly from ammonium bifluoride in the following manner. Ammonium bifluoride containing 0.5 percent water by weight was volatilized in stainless steel equipment. The gases were passed through a catalyst bed of steel wool heated to a temperature of 700 degrees centigrade. Unaltered ammonia was condensed as ammonium bifluoride at the exit of the catalyst bed and was recycled. The exit gases were collected and separated by compressing and cooling to a temperature of 10 degrees centigrade. Liquid hydrogen fluoride condensed was separated from the gaseous hydrogen and nitrogen.

Analysis of the recovered gases indicated that the ammonium bifluoride was decomposed to hydrogen fluoride, hydrogen and nitrogen.

Example 2 was repeated as a continuous process with equally good results. Nickel, copper, zinc, cadmium, cobalt and chromium catalysts were used and found to effect the decomposition of ammonia to hydrogen and nitrogen. Excellent results were also obtained.

Example 3

This example illustrates the recovery of anhydrous hydrogen fluoride from flue gases containing minor percentages of fluorine values.

The gases evolved from the acidulation of phosphate rock were scrubbed with water to absorb the soluble gases. Liquor from the scrubber was ammoniated by the addition of sufficient ammonia to increase the pH to 9.0. The liquor was then filtered and the filtrate was conducted to a boiler to dehydrate the ammoniated solution.

After removing substantially all of the water and excess ammonia by heating at a temperature of 140 degrees centigrade to 150 degrees centigrade the residue, which was substantially ammonium bifluoride, was volatilized by continued heating up to 250 degrees centigrade. The vapors were passed through a nickel oxide catalyst bed heated to a temperature of 750 degrees centigrade. The gases leaving the catalyst bed were cooled to 130 degrees centigrade. A small amount of ammonium bifluoride condensed and was recycled through the catalyst bed.

Hydrogen fluoride was separated from the gaseous decomposition products by cooling the gas mixture to about 10 degrees centigrade and condensing liquid hydrogen fluoride. The nitrogen and hydrogen did not condense and were readily separated from the anhydrous hydrogen fluoride liquid. Analysis of the liquid and the gases collected indicated that the decomposition was according to the equation: $2NH_4HF_2 \rightarrow 4HF + N_2 + 3H_2$.

While there have been described various embodiments of the invention, the methods described are not to be understood as limiting the scope of the invention, as it is realized that changes therein are possible. It is further intended that each element recited in the following claims is to be understood as referring to all equivalent elements for accomplishing substantially the same results in substantially the same or equivalent manner. It is intended to cover the invention broadly in whatever form its principles may be utilized.

What is claimed is:

1. A method for recovering hydrogen fluoride from ammonium bifluoride-containing compositions which comprises heating an ammonium bifluoride containing composition having a water-content which is not substantially in excess of about 6% by weight, under substantially non-oxidizing conditions at a temperature within the range of about 126 to 250 degrees centigrade, effecting vaporization of said ammonium bifluoride-containing system by said heating and subsequent formation of a gas mixture containing ammonia and hydrogen fluoride components, contacting the thus-produced gas mixture with a catalyst at a temperature within the range of about 230 to 1000 degrees centigrade, thereby decomposing the ammonia component of said gas mixture to hydrogen and nitrogen, with substantially no decomposition of the hydrogen fluoride component and, thereafter, recovering hydrogen fluoride from the resulting gas mixture of nitrogen, and hydrogen fluoride.

2. The method as claimed in claim 1 wherein the ammonium bifluoride containing composition is obtained by scrubbing a gas containing fluorine values with an aqueous liquor to obtain an aqueous phase containing the fluorine values, ammoniating the thus-obtained aqueous phase with excess ammonia to precipitate impurities therefrom, separating the thus-formed precipitate from the aqueous phase and, thereafter, heating the aqueous phase from which the precipitate has been separated at a temperature above about 100° centigrade to remove water and a portion of the ammonia contained therein and form an ammonium bifluoride containing composition.

3. The method as claimed in claim 2 wherein the nitrogen and hydrogen formed by the decomposition of the ammonia component are reconverted to ammonia after the hydrogen fluoride has been separated.

4. The method as claimed in claim 3 wherein the catalyst used in decomposing the ammonia component to hydrogen and nitrogen is selected from the group consisting of the metals iron, nickel, copper, zinc, cadmium, cobalt, chromium, their oxides, their fluorides and mixtures thereof.

References Cited by the Examiner

UNITED STATES PATENTS

| | | | |
|---|---|---|---|
| 1,083,585 | 1/1914 | Bosch et al. | 23—198 |
| 1,089,240 | 3/1914 | Matignon | 23—198 |
| 2,456,509 | 12/1948 | Hopkins et al. | 23—153 |
| 2,578,193 | 12/1951 | Marshall | 23—220 X |
| 2,601,221 | 6/1952 | Rosenblatt et al. | 23—220 X |
| 2,813,000 | 11/1957 | Quittendon | 23—153 |
| 3,005,684 | 10/1961 | Riedl et al. | 23—88 |
| 3,106,449 | 10/1963 | Fitch | 23—88 |
| 3,128,152 | 4/1964 | Second et al. | 23—153 |
| 3,198,604 | 8/1965 | Pfefferle | 23—202 |
| 3,212,849 | 10/1965 | Kauders | 23—88 |

OTHER REFERENCES

AEC-tr-3927, part I, "The Chemistry of Fluorine and Its Inorganic Compounds," pp. 127 and 128, by Prof. I. G. Ryss, Moscow, 1956.

Simon's book on "Fluorine Chemistry," vol. 1, 1950 edition, p. 30. Academic Press Inc., Publishers, New York.

Supp. to Mellor's "A Comprehensive Treatise on Inorganic and Theoretical Chemistry," vol. 8, (Supp. I), Nitrogen (Part I) 1964, p. 372. Longmans, Green & Company, New York.

OSCAR R. VERTIZ, *Primary Examiner.*

EDWARD STERN, *Examiner.*

UNITED STATES PATENT OFFICE
CERTIFICATE OF CORRECTION

Patent No. 3,316,060            April 25, 1967

Theodore Henry Dexter et al.

It is hereby certified that error appears in the above numbered patent requiring correction and that the said Letters Patent should read as corrected below.

Column 3, lines 33 and 34, for "metal oxide catalysts" read -- metal or metal oxide catalysts --; column 4, line 61, for "thhe pre-heater" read -- the pre-heater --; column 5, line 50, for "and recycle" read -- and recycles --; column 8, lines 3 and 4, for "nitrogen, and hydrogen fluoride." read -- nitrogen, hydrogen and hydrogen fluoride. --.

Signed and sealed this 28th day of November 1967.

(SEAL)
Attest:

Edward M. Fletcher, Jr.

Attesting Officer

EDWARD J. BRENNER

Commissioner of Patents